(12) United States Patent
Cannon et al.

(10) Patent No.: US 7,151,834 B1
(45) Date of Patent: Dec. 19, 2006

(54) METHODS AND DEVICES FOR CONTROLLING FACSIMILE TRANSMISSIONS OF CONFIDENTIAL INFORMATION

(75) Inventors: Joseph M. Cannon, Harleysville, PA (US); James A. Johanson, Macungie, PA (US); Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 774 days.

(21) Appl. No.: 09/632,214

(22) Filed: Aug. 3, 2000

(51) Int. Cl.
*H04L 9/32* (2006.01)

(52) U.S. Cl. ............ 380/246; 380/243; 358/400; 726/2; 713/182

(58) Field of Classification Search ............ 380/243, 380/244, 246; 358/400; 713/202, 182; 726/2
See application file for complete search history.

(56) References Cited

U.S. PATENT DOCUMENTS

| | | | | |
|---|---|---|---|---|
| 5,202,920 A | * | 4/1993 | Takahashi | 380/243 |
| 5,241,595 A | * | 8/1993 | Kuno | 380/243 |
| 5,258,998 A | * | 11/1993 | Koide | 375/220 |
| 5,321,749 A | * | 6/1994 | Virga | 380/243 |
| 5,353,124 A | * | 10/1994 | Chou et al. | 358/400 |
| 5,848,156 A | * | 12/1998 | Murakami | 380/243 |
| 6,094,277 A | * | 7/2000 | Toyoda | 358/1.15 |
| 6,097,504 A | * | 8/2000 | Nobuta | 358/434 |
| 6,108,103 A | * | 8/2000 | Kurozasa | 358/405 |

FOREIGN PATENT DOCUMENTS

JP    10-070528    * 10/1998

OTHER PUBLICATIONS

Schneier, Bruce, Applied Cryptography, 1996, John Wiley & Sons, 2nd edition.*

* cited by examiner

*Primary Examiner*—Taghi T. Arani

(57) ABSTRACT

Confidential information is protected from unauthorized or accidental disclosure by requiring a successful comparison of near end and far end passwords prior to a facsimile transmission of the confidential information.

22 Claims, 2 Drawing Sheets

METHODS AND DEVICES FOR CONTROLLING FACSIMILE TRANSMISSIONS OF CONFIDENTIAL INFORMATION

BACKGROUND OF THE INVENTION

Facsimile ("fax") machines provide the valuable ability to transmit documents quickly and easily from one location to another. One problem with their current capabilities, however, relates to the transmission of confidential information. Typically, a person sending a fax has little control over the document once it is sent. Fax machines are often shared in an office environment where it is possible, even likely, that parties other than the intended recipient will be able to view the document once it is received. The current state of affairs is that confidential information, such as employment or business information, which should not be shared, either is not sent by fax or runs the risk of being disclosed to others if it is sent by fax.

As a partial solution to this problem, there exist fax machines that have the ability to both receive a fax that contains confidential information and to store an electronic version of the fax until the recipient enters a password, at which time the electronic version is printed out on paper. This is only a partial solution, however, because the sending party cannot always know if the receiving fax machine has sufficient memory to store the confidential information. Additionally, the sending party cannot always know if the receiving fax machine has adequate security features to prevent access by interlopers. For example, a machine with adequate security features would limit the number of attempts to enter a password in order to prevent an unauthorized recipient from guessing the correct password. Consequently, if the receiving machine has insufficient or no memory, or if the machine has inadequate or no security features, then the confidential information is vulnerable to disclosure to parties other than the intended recipient.

This "receive and hold" solution has another drawback in that it requires both the sending and receiving machines to be adapted to control access to the confidential information. Even if the sender uses a "receive and hold" near-end machine (i.e., the machine operated by the sender), if the recipient is not equally equipped on the far end (i.e., the position of the recipient's machine), the transmission will not be completed successfully. This solution is, therefore, not universally employable.

It is therefore desirable to provide methods and devices for controlling the facsimile transmission of confidential information.

It is further desirable to control the facsimile transmission of confidential information regardless of whether a far-end fax machine has sufficient memory or security to maintain the confidentiality of transmitted information.

Other desires will become apparent to those skilled in the art from the following description taken in conjunction with the accompanying drawings and claims.

SUMMARY OF THE INVENTION

In accordance with the present invention, there are provided devices and methods for controlling a facsimile transmission of confidential information. A device envisioned by the present invention is adapted to allow transmission of near end, confidential information to a far end only if a comparison of a near end password with a far end password results in a match. The comparison is conducted at the near end prior to transmission for added security.

Such a device may comprise a facsimile machine, a PC modem, a chipset, digital signal processor or the like. In addition, the present invention envisions combining the above features with the capability of transmitting encrypted or non-encrypted confidential information.

Devices and methods envisioned by the invention may also comprise features and functions used to receive such confidential information as well. For example, the same (or different) device may also generate a notification signal upon receipt of a near end, password request signal or an instruction signal to prompt a far end, intended recipient to enter a password or distribution instructions, respectively.

The present invention and its advantages can be best understood with reference to the drawings, detailed description of the invention, and claims that follow.

DETAILED DESCRIPTION OF THE INVENTION

Figure 1:
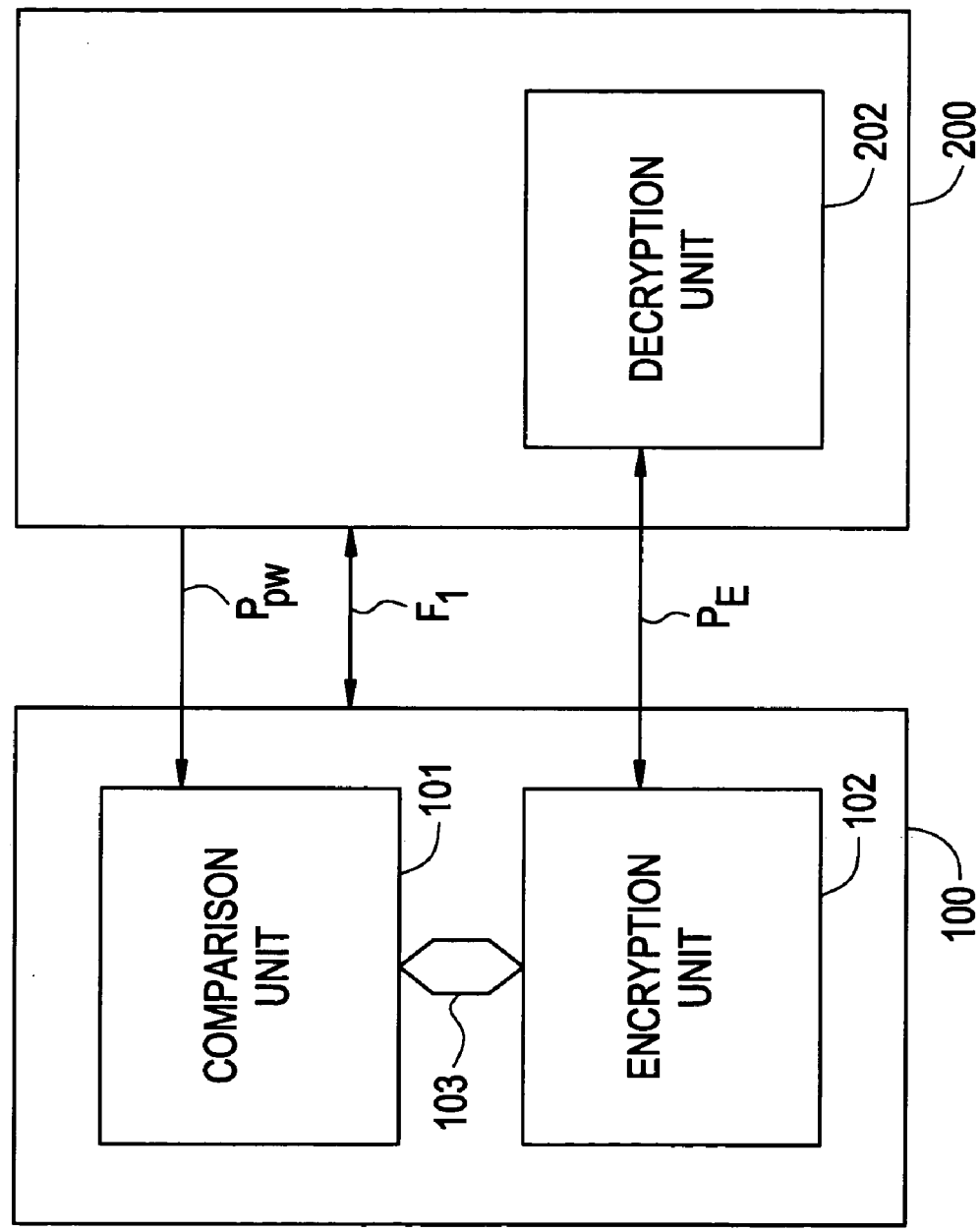
FIG. 1 depicts a device for controlling the facsimile transmission of confidential information according to one embodiment of the present invention.

FIG. 1 shows a device 100 adapted to control the facsimile transmission of confidential information. In an illustrative embodiment of the present invention, device 100 may be part of a larger device, such as a fax machine. That said, the present invention also envisions device 100 as comprising a stand-alone device as well. It should be understood that the devices and other units shown in FIGS. 1 and 2, are just some of the units making up a fax machine or the like.

Figure 2:
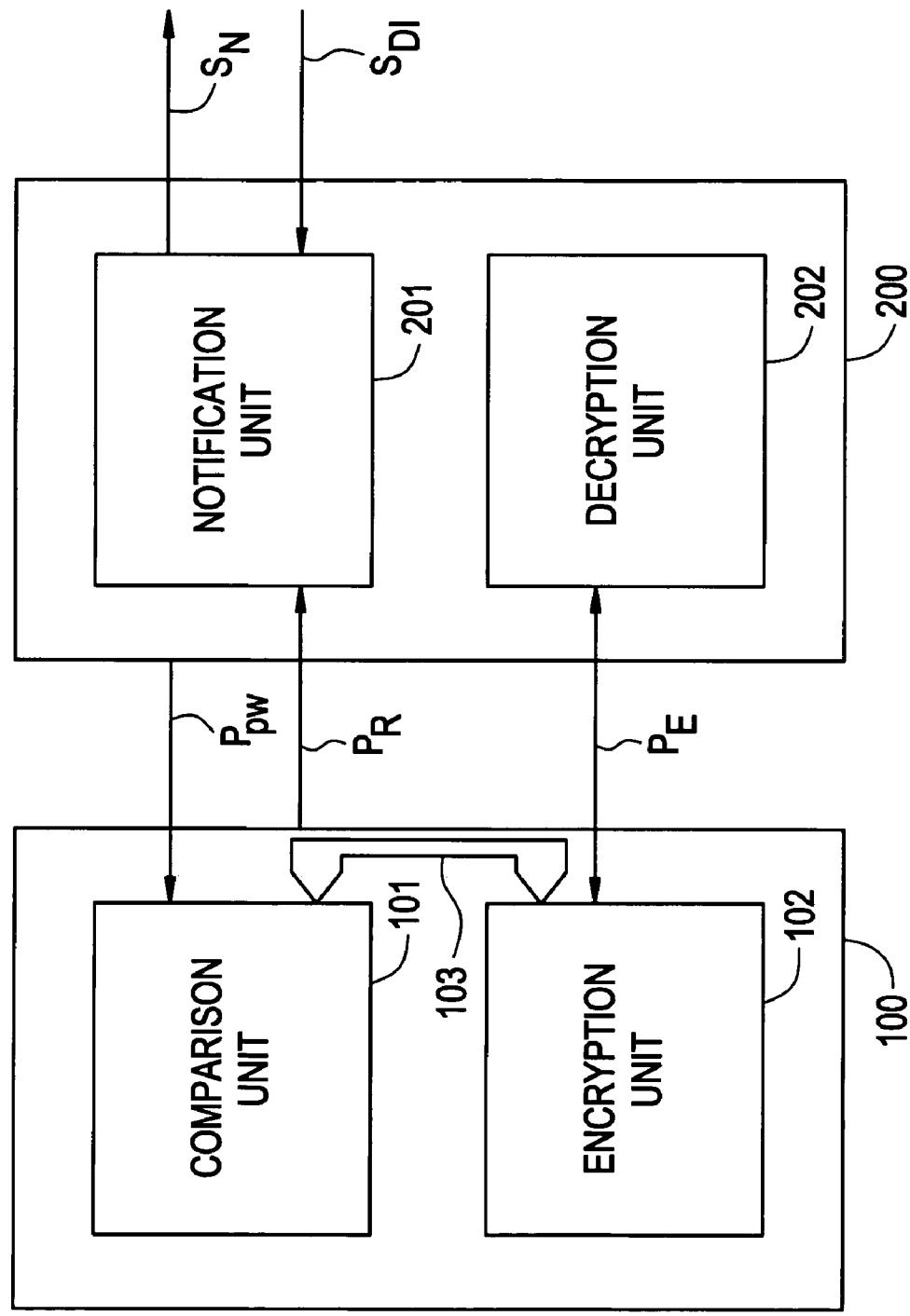
FIG. 2 depicts a device for controlling the facsimile transmission of confidential information according to another embodiment of the present invention.

When shown as separate units, some or all of the units in FIGS. 1 and 2 may be combined into a single unit or device. Likewise, the units may be further broken down into additional units that perform substantially the same functions and operate in substantially the same manner as the separate units. Though referred to as a fax "machine," it should be understood that the device 100 may take the form and shape of any device that transmits confidential information via facsimile, or controls the facsimile transmission of confidential information. In alternative embodiments of the invention, the device 100 may comprise a PC modem/fax board, chipset, digital signal processor, or the like.

One example of how the device 100 operates to control the facsimile transmission of confidential information is as follows.

In an illustrative embodiment of the invention, the device 100 comprises a near-end fax machine. As depicted in FIG. 1, the device 100 comprises comparison unit or means 101 adapted to control the facsimile transmission of confidential information. In one embodiment of the invention, the comparison unit 101 is first adapted to compare a far-end password, received via pathway $P_{PW}$, against a near-end password stored in the comparison unit 101 or elsewhere within device 100 or within a device connected to device 100. Though referred to as a password, it should be understood that the password may take the form of any signal that can be used to control the transmission of, and access to, confidential information. In alternative embodiments of the invention, the password may commonly comprise a personal identification number (PIN), alpha-numeric characters or the like.

The comparison unit 101 is further adapted to allow the transmission of a facsimile to far end device 200 via pathway $F_1$, input into or stored within device 100, using means known in the art, only if the comparison above results in a match. Thus, unlike existing devices and methods which transmit facsimiles and then compare passwords at the far end, the present invention completes the comparison at the near end before a facsimile is sent to a far end or intermediate device.

FIG. 1 shows an additional embodiment of the present invention in which the device 100 further comprises encryption unit or means 102. The encryption unit 102 may be adapted to utilize any number of techniques. For example, the encryption unit may be adapted to generate pretty-good-privacy ("PGP")-like, encrypted transmissions which may be decrypted at a far end using public and/or private decryption keys.

Additionally, FIG. 1 shows a device 200, which, for example, may comprise a far end fax machine. As shown, the device 200 comprises decryption unit or means 202 adapted to decrypt confidential information sent via pathway $P_e$.

FIG. 2 shows a further embodiment of the present invention, in which the far end device 200 further comprises notification unit or means 201. The notification unit 201 is adapted to generate and/or transmit a notification signal along pathway $S_N$ to an intended recipient upon receipt of a password request signal from the near end device via pathway $P_R$. Though shown as three pathways, it should be understood that $P_{PW}$, $P_r$ and $P_E$ may comprise any number of pathways, including only one.

The notification signal is intended to be used to notify an intended recipient that communications between the near end fax 100 and far-end fax 200 have begun, and that the near end fax 100 is awaiting the input and transmission of the far end password, $P_{Pw}$. This spares the recipient the time-consuming experience of waiting by the far end fax 200 for a transmission to begin or end before entering a password.

The exact nature of the notification signal may vary depending upon the needs of the recipient (e.g., how close the recipient is to the fax machine). For example, the notification signal $S_N$ may comprise audible signals intended for one or more recipients, display signals for displaying the identity of one or more intended recipients, or alternatively, may comprise signals compatible with a printer for printing out a cover sheet indicating the names or identifications of one or more intended recipients, to name just a few examples.

In alternative embodiments of the invention, the notification signal $S_N$ may be sent to a recipient via a recipient's local area network (LAN), wireless computing device, electronic mail (e-mail) device, pager, or a voice device. Additionally, the notification signal $S_N$ may comprise any number of communication signals such as an analog signal or a digital signal.

In an additional illustrative embodiment of the present invention, once an intended recipient has input a correct password and once confidential information is received, it may be distributed as follows.

In an illustrative embodiment of the invention, the notification unit 201 is further adapted to generate a "distribution request signal" which it sends to the recipient along pathway $S_N$. The distribution request signal is intended to prompt an intended recipient to instruct the far end device 200, via signals sent along pathway, $S_{DI}$, how to distribute the confidential information. The distribution instructions may comprise any number of instructions. For example, the distribution instructions may comprise instructions to transmit the received confidential facsimile information to an output unit. In alternative embodiments of the invention, the output unit may take the form and shape of any device adapted to output the received confidential facsimile information to the recipient. In alternative embodiments of the invention, the output unit may comprise a far end printer, a LAN, a wireless computing device, or an e-mail device.

As with the pathways between the near end device 100 and far end device 200, the pathways between the far end device 200, that is, $S_N$ and $S_{DI}$, may be combined into one or further broken down into more than two pathways.

In alternative embodiments of the present invention, some or all of the functions and features of the near end device 100 and the far end device 200 can be combined into one device.

Though the description above has focused on devices, the present invention also envisions methods for controlling the transmission of confidential facsimile information.

It is to be understood that changes and variations may be made without departing from the spirit and scope of this invention as defined by the claims that follow.

We claim:

1. A device for controlling a facsimile transmission of confidential information comprising:
   a comparison unit adapted to compare, at a near end, a near end password with a far end password entered after communications between a near end fax and a far-end fax have begun, said far end password not pre-registered before communications between said near end fax and said far-end fax have begun; and
   a transmission unit adapted to allow transmission of confidential information to a far-end fax if said near end comparison of said near end password with said far end password results in a match.

2. The device as in claim 1, wherein said device comprises:
   a facsimile machine.

3. The device as in claim 1, wherein said device comprises:
   a PC modem.

4. The device as in claim 1, wherein said device comprises:
   a chipset.

5. The device as in claim 1, wherein said device comprises:
   a digital signal processor.

6. The device as in claim 1, further comprising:
   an encryptor adapted to encrypt confidential information.

7. The device as in claim 6, wherein:
   said encryptor is adapted to PGP-encrypt said confidential information.

8. The device as in claim 1, further comprising:
   a decryptor adapted to decrypt confidential information.

9. The device as in claim 1, further comprising:
   a signal module adapted to generate a notification signal upon receipt of a password request signal.

10. The device as in claim 1, further comprising:
    a signal module adapted to generate a distribution request signal to prompt a far end user to enter distribution instructions.

11. A method for controlling facsimile transmission of confidential information, comprising:

comparing, at a near end, a near end password with a far end password entered after communications between a near end fax and a far-end fax have begun, said far end password not pre-registered before communications between said near end fax and said far-end fax have begun; and authorizing transmission of confidential information from said near end fax to said far-end fax if said comparison results in a match.

12. The method as in claim 11, further comprising:
encrypting said confidential information.
13. The method as in claim 12, further comprising:
PGP-encrypting said confidential information.
14. The method as in claim 12, further comprising:
PGP-encrypting said confidential information.
15. The method as in claim 11, further comprising:
decrypting confidential information.
16. The method as in claim 11, further comprising:
generating a notification signal upon receipt of a password request signal.
17. The method as in claim 11, further comprising:
generating a distribution request signal to prompt a user at said far-end fax to enter distribution instructions.
18. The method as in claim 11, further comprising:
encrypting said confidential information.
19. The method as in claim 11, further comprising:
decrypting confidential information.
20. The method as in claim 11, further comprising:
generating a notification signal upon receipt of a password request signal.
21. The method as in claim 20, further comprising:
generating a distribution signal to prompt a user at said far-end fax to enter distribution instructions.
22. A method for controlling facsimile transmission of confidential information, comprising:

comparing, at a near end, a near end password with a far end password entered after communications between a near end fax and a far-end fax have begun, said far end password not pre-registered before communications between said near end fax and said far-end fax have begun;

encrypting said facsimile; and authorizing transmission of confidential information from said near end fax to said far-end fax if said comparison results in a match.

* * * * *